United States Patent Office 2,907,427
Patented Oct. 6, 1959

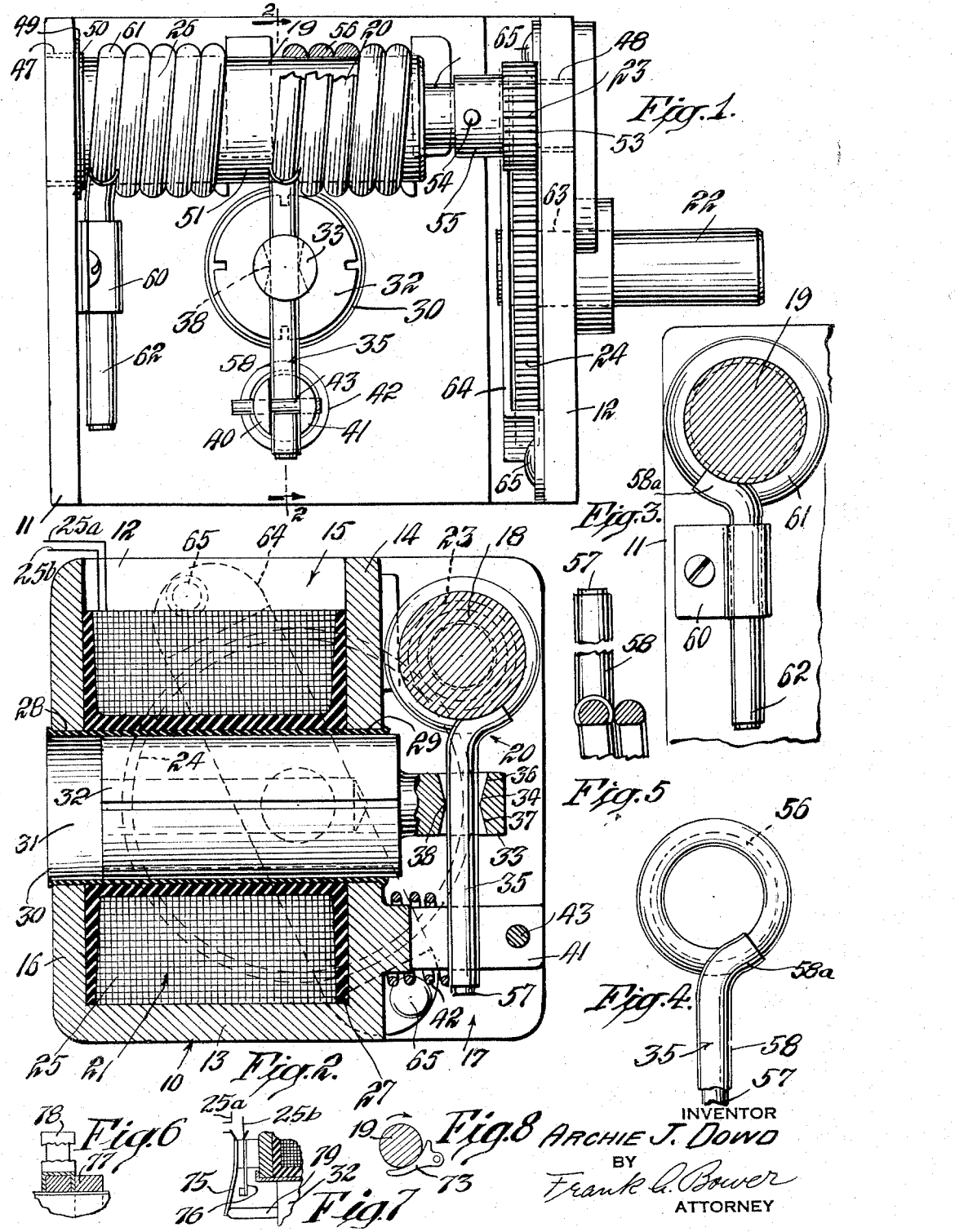

2,907,427

SPRING CLUTCH

Archie J. Dowd, West Orange, N.J., assignor to The Viking Tool & Machine Corporation, Belleville, N.J., a corporation of New Jersey Application December 18, 1953, Serial No. 398,981

3 Claims. (Cl. 192—41)

This invention relates to apparatus for converting reciprocatory motion into rotary motion, and particularly to spring clutches that grip a shaft on actuation in one direction and release on actuation in the opposite direction.

An object of the invention is to provide an electric motor that converts reciprocatory motion to rotary motion.

Another object of the invention is to provide a spring clutch that is easily and inexpensively manufactured and durable and reliable in continuous operation for long periods.

A further object of this invention is to provide a low power electric motor that rotates a shaft through small angles quickly and precisely.

A still further object is to provide an actuating motor that is inexpensive to manufacture and reliable in operation.

A still further object is to provide an inexpensive motor that is small and compact in size.

Other and further objects and advantages will be apparent from the following description taken in connection with the accompanying drawing in which, Fig. 1 is an end view of the motor;

Fig. 2 is a sectional view of the motor taken along lines 2—2 of Fig. 1;

Fig. 3 is a fragmentary sectional view illustrating the spring clutch;

Fig. 4 is an intermediate step in the formation of the spring clutch;

Fig. 5 is a fragmentary sectional view of the spring clutch.

Fig. 6 is a fragmentary view of a rectangular shaped spring clutch; and

Fig. 7 is a fragmentary view of a switch for connecting the motor to a direct current supply; and Fig. 8 is a view of a brake.

In Figs. 1 and 2 a cast steel frame or casing 10 is shown supporting the operating elements of the motor. An output shaft 22 is driven through the gearing 22a, shaft 19, and spring clutch 20 by the reciprocatory armature 32 of the solenoids 25. The side walls 11 and 12 are spaced with the spaced end wall 13 and intermediate wall 14 extending transversely between to form a compartment 15. One end of the compartment is closed by the bottom wall 16.

The shaft 19 is journaled in the side walls 11 and 12. The gearing 22a is mounted on the side wall 12 and extends through the slot 14a between the side wall 12 and the intermediate wall 14. The wall 14 is attached to the side wall 12 by the wall portion 14b.

The spring clutch 20 grips and turns the shaft 19 on an inward movement or actuating stroke of the spring clutch and on an outward movement or return stroke the spring clutch releases and slides on the shaft 19. The spring brake 26 is held stationary by the wall 11 and grips the shaft against rotation on the outward movement or return stroke of the spring clutch and slides in relation to the shaft on an actuating or inward movement of the spring clutch. The solenoid 21 comprises a spool 27 with an electrical coil 25 wound around to create a magnetic field extending longitudinally through the center of the spool on energization of the coil. The coil 25 is connected to a suitable supply by lines 25a, b. The walls 13 and 14 have openings 28 and 29 in which a tubular sleeve 30 is positioned and extends through the central passage of the spool 27. The sleeve 30 has an inner cylindrical wall 31 in which the armature 32 longitudinally slides. The armature 32 has a stud 33 with a bearing 34 through which the arm 35 of the spring clutch extends. The bearing 34 has conical-shaped surfaces 36, 37 forming a circular ridge 38 engaging the arm 35.

The spool 27 fits snugly between the walls 13 and 14 and is held against axial movement by the walls. On energization of the coil 25 a magnetic field is created and the armature 32 is drawn longitudinally into the sleeve 30 to shorten the magnetic path of the field. The arm 35 is drawn inwardly and the shaft 19 is incrementally rotated. The armature is cylindrically shaped and slideably fits in the split sleeve 30. The arm 35 extends between fingers or guides 40 and 41 and engages helical spring 42 formed around the fingers or guides 40, 41. A spring 42 is positioned between the arm 35 and the wall 14. On an inward movement of the arm 35 the spring 42 is compressed and on release of the armature the spring 42 forces the armature 32 and the arm 35 outwardly. A pin 43 is mounted in the outer ends of the fingers 41, 42 to block the space between guides and retain the arm 35 between the fingers 40, 41. The pressure of the helical spring on the arm 35 forces the clutch to release the shaft 19 and the arm is forced outward pulling the armature 32 to its outward or displaced position.

The driven shaft 19 is journaled in the bushings 47 and 48 in walls 11 and 12 respectively and held against longitudinal movement by the snap ring 49 keyed in the groove 50 on the shaft 19 and the stud gear 23. The shaft 19 has a main cylindrical gripping surface 51 and a smaller stud 52. The gear 23 with teeth 53 is mounted on the stud 52 and fastened by the pin 54 extending through collar 55 and the stud 52. The spring clutch has a helical spring portion 56 and an arm 35. The arm 35 comprises a portion 57 extending from the turns of the helical spring and a sleeve 58 snugly fitting on the portion 57 and a segment of the turn of the spring and the bend 58a between the turn and the portion 57.

The spring clutch is formed from the helical spring 56 with the portion 57 extending tangentially. The sleeve 58 is placed on the extending portion 57 and then bent to form the continuation of a turn with the helical spring. The end portion 58a of the sleeve is formed with the end of the first turn. The extending portion 57 projects radially from the spring. The inner surface of the helical spring is machined and lapped, reducing the cross sectional area of the coils to form a helical ribbon surface 68. A major portion of the cross sectional area of the coil remains so that the thickness of each coil is greater than the radius of the cross section of the cylindrical coil. The outer surface preferably curves inward to provide a space between the coils and an inner gripping surface for the end portion 58a of the sleeve. The coil should be more flexible than the arm projecting from the shaft.

The machining of the spring removes the inner wall of sleeve 58 so that two edges 61, 62 curve inwardly to engage the driven shaft 19. The sleeve is preferably of a stiff hard metal such as a hard drawn stainless steel or a beryllium copper. The sleeve stiffens the inner portions 57 and stiffens the bend between the inner portion 57 and the last turn. The turn portion 58a is of a U or cylindrical shape that extends and grips the inner curved portion of the helical spring turn. This clamping of the end of the last turn makes the arm and the turn a rigid member so that any pressure applied to the arm 35 will be immediately transferred to the spring. The spring is under an initial stress and snugly grips the shaft so that the initial force applied to the arm will not turn the clutch on the shaft. The arm 35 is stiff and rigid and the first turn 56a of the spring 56 is flexible and resilient so that the turn 56a of the spring flexes and the arm 35 remains rigid on actuation. The turn 56a flexes against the turns 56b–d. These turns snugly grip the shaft and provide a base for flexing the turn or coil 56a. On an actuating stroke the coil 56a is forced against the shaft and grips it to turn the shaft. On a return stroke the turn 56a is expanded by opening against the coils 56b–d. On release of the pull of the armature the compressed spring 20 presses against the end of the arm 35 in the opposite direction to the force applied by the armature. The arm 35 expands the coil 56a permitting the clutch to slide on the shaft. The stiff sleeve 58 and the portion 58a tend to lift the end of the last turn from the shaft thereby relaxing the grip of the clutch.

The spring 36 may have other cross sectional forms such as a rectangular shape as illustrated in Fig. 6 by spring 77 and a stiffening sleeve 78. The arm of the spring must be stiffer than the turn 56a. The spring 56 should have two or more turns and for smooth and reliable performance the spring should preferably have four or five turns. The armature 32 has a vibratory action of a short amplitude. A short rapid actuating force is applied to the spring clutch by the armature. The returning force is applied by the spring 42. The spring returns the arm to the outward or displaced position as the actuating force is reapplied. The motion of the arm is therefore regular and smooth. If 60 cycle current is used, 120 impulses per minute are imparted to the shaft. The amplitude of the armature is a fraction of the radius of the shaft and therefore the shaft is turned through small increments or angles. The rapid vibration of the armature makes the rotations of the shaft substantially continuous. Higher frequencies may be used imparting a smoother rotation of the shaft. The shaft 19, gear 23 and gear 24 are light in weight so the response of the output shaft to the solenoid is rapid. The output shaft may be set accurately and without hunting.

The brake spring clutch 26 similar to the driving clutch is mounted on shaft 19 and fastened against rotation by the clamp 60 bolted to the wall 11. The brake has a helical spring 61 and an arm 62 held by the clamp 60. The spring 61 fits snugly on the shaft 19. On an inward movement of the arm 35 the shaft 19 is rotated. The grip of the spring 61 on the shaft 19 is released so that there is only a slight drag on the shaft 19. Rotation of the shaft 19 in the opposite direction increases the grip of the spring 61 so the shaft 19 is held securely in position. On the next actuating stroke the shaft is turned. The spring clutch brake 26 is held longitudinally in position by the stop 71 and the spring clutch 20 is held longitudinally in position by the stop 72, each stop being secured to the intermediate wall 14.

Instead of a spring brake with a helical coil holding the shaft on the return movement, a concave brake shoe 73 (Fig. 8) may be positioned off center to grasp the shaft 19 on return movement and release on an actuating stroke.

The gear 23 is keyed to the output shaft 22. The shaft 22 is mounted in the bearing 63 in the wall 12 and the bearing 65 in the metal strap or member 64 mounted diagonally on the wall 12 and fastened thereto by bolts 66.

It is thus seen that the spring clutch is simple, inexpensive to manufacture and easily and readily manufactured. The sleeve is easily fitted on the portion 58 and bent to stiffen the bend between the turn of the spring and the portion 58. The spring clutch is easily tempered and machined to provide a smooth cylindrical gripping surface.

The sleeve forms a stiff rigid arm and a stiff rigid joint 68 with the coil of the helical spring. The joint 68 extends along the coil to secure the rigidity of the connection of the arm to the coil and the immediate transmission of an actuating force to the coil to tighten or loosen the grip on the driven shaft. On the application of a force to the arm such as by the armature 32 the arm tends to pivot at the base of the bend 69 providing an initial dynamic gripping stress. The arm further draws the spring circumferentially to tighten the grip of the coil. The helical ribbon surface provides a large gripping surface area between the shaft and the clutch. Thus a stiff radial arm rigidly connected to the helical spring provides a rapid response to the reciprocating force in gripping and rotating the shaft.

In another embodiment (Fig. 7) the motor is operated from a direct current supply. A switch 74 is actuated by the armature 32. The contacts 75, 76 of the switch are connected in the input line 25b of the solenoid so that on the opening of the contacts the supply of direct current to the solenoid 21 will be interrupted. The armature has a projection 79 that permits the contact to close when it is in an outward or deenergized position and which opens the contact when it is in an inward or energized position after an actuating stroke. Thus when the armature is drawn in by the direct current passing through the closed contact the armature automatically opens the contact, deenergizing the solenoid 21 and permitting the spring 42 to return the armature to an outward position thereby closing the contact. Thus the armature is subjected to repeated actuations turning the shaft 19.

Various modifications may be made in the various embodiments without departing from the scope of the invention.

1. A spring clutch for rotating a shaft comprising a tightly coiled spring having a plurality of coils of resilient material on said shaft including an end coil for applying an initial inward gripping stress, a stress-increasing member having a stiff lateral extension from the end of the coil of said spring and a sleeve snugly fitting on said extension with a portion of said sleeve extending along a segment of the end coil adjacent to the end thereof to form a connection and said lateral extension being stiffer and more rigid than said end coil.

2. A spring clutch as claimed in claim 1, wherein said spring has a cylindrical inner surface and said coils have a smaller reduced cross-sectional area than said stress increasing member.

3. A spring clutch as claimed in claim 1 wherein the coils of said spring have a rectangular cross-section.

References Cited in the file of this patent
UNITED STATES PATENTS

| | | |
|---|---|---|
| 255,957 | English | Apr. 4, 1882 |
| 631,957 | Diescher | Aug. 29, 1899 |
| 1,403,767 | Goff | Jan. 17, 1922 |
| 2,488,766 | De Moss | Nov. 22, 1949 |
| 2,575,012 | Harvey | Nov. 13, 1951 |
| 2,577,181 | Christensen | Dec. 4, 1951 |
| 2,685,208 | Lundquist | Aug. 3, 1954 |
| 2,740,624 | Cottrell | Apr. 3, 1956 |